US008281402B2

(12) United States Patent
Sahita et al.

(10) Patent No.: US 8,281,402 B2
(45) Date of Patent: Oct. 2, 2012

(54) NETWORK VULNERABILITY ASSESSMENT OF A HOST PLATFORM FROM AN ISOLATED PARTITION IN THE HOST PLATFORM

(75) Inventors: Ravi Sahita, Beaverton, OR (US); Uday Savagaonkar, Beaverton, OR (US); Hormuzd Khosravi, Portland, OR (US); Uri Blumenthal, Fair Lawn, NJ (US)

(73) Assignee: Intel Corporation, Santa Clara, CA (US)

( * ) Notice: Subject to any disclaimer, the term of this patent is extended or adjusted under 35 U.S.C. 154(b) by 1681 days.

(21) Appl. No.: 11/435,038

(22) Filed: May 16, 2006

(65) Prior Publication Data
US 2007/0271360 A1    Nov. 22, 2007

(51) Int. Cl.
*H04L 29/06*    (2006.01)
(52) U.S. Cl. ........................................................ 726/25
(58) Field of Classification Search .............. 726/22–25; 713/1–2
See application file for complete search history.

(56) References Cited

U.S. PATENT DOCUMENTS

| | | | | |
|---|---|---|---|---|
| 5,757,917 A * | 5/1998 | Rose et al. | ....................... | 705/79 |
| 7,174,465 B2 * | 2/2007 | Freeman et al. | .............. | 713/191 |
| 7,275,163 B2 * | 9/2007 | Cocchi et al. | ................. | 713/193 |
| 7,448,067 B2 * | 11/2008 | Yadav | ............................. | 726/1 |
| 7,649,854 B2 * | 1/2010 | Piper | ............................. | 370/265 |
| 2006/0164199 A1 * | 7/2006 | Gilde et al. | .................... | 336/234 |
| 2008/0059105 A1 * | 3/2008 | Resnick et al. | .............. | 702/118 |

\* cited by examiner

*Primary Examiner* — Gilberto Barron, Jr.
*Assistant Examiner* — Simon Kanaan
(74) *Attorney, Agent, or Firm* — Blakely, Sokoloff, Taylor & Zafman LLP

(57) ABSTRACT

According to embodiments of the present invention, host platform device includes an embedded firmware agent that may detect an attempt by the host platform device to fully connect to a network. The firmware agent may restrict traffic between the host platform device and the network to bootstrap traffic, test the device to determine device vulnerability, may temporarily stop access to other peripheral devices, and transmit a report of the device vulnerability to a remote policy server. After the test(s) are performed, the firmware agent may receive an indication from the remote policy server as to whether the device is permitted to fully connect to the network and, if so, whether there are any further restrictions on traffic flow, for example, and if the peripheral device access may be allowed.

24 Claims, 5 Drawing Sheets

200

500

NETWORK VULNERABILITY ASSESSMENT OF A HOST PLATFORM FROM AN ISOLATED PARTITION IN THE HOST PLATFORM

BACKGROUND

1. Field

Embodiments of the present invention relate to networked electronic devices and, in particular, to network vulnerability assessment of electronic devices.

2. Discussion of Related Art

Network access control is the process of verifying that a particular platform's posture is valid before it is allowed on the network and given access to network resources. The posture of a platform can be quantified using various metrics. One example metric that Information Technology (IT) organizations in enterprise networks care about is the operational status of platform security agents such as firewalls and anti-virus software, for example. Another example metric that IT organizations in enterprise networks care about is the configuration state of such security agents.

There are various ways in which a security agent can be attacked. Some examples in which a security agent may be exposed to attack include software vulnerabilities, bugs, and configuration errors. Software vulnerabilities may include malware such as computer viruses, Trojan horses, and worms, for example. If the security agent becomes compromised, any network it is connected to may also become vulnerable. Additionally, other machines on the network may be exposed to the same exploit. Network administrators are continually challenged by such threats from malware, but current detection techniques are generally reactive, and are designed to react to known malware after it already has been spread within the network.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which.

DETAILED DESCRIPTION OF EMBODIMENTS

Figure 1:
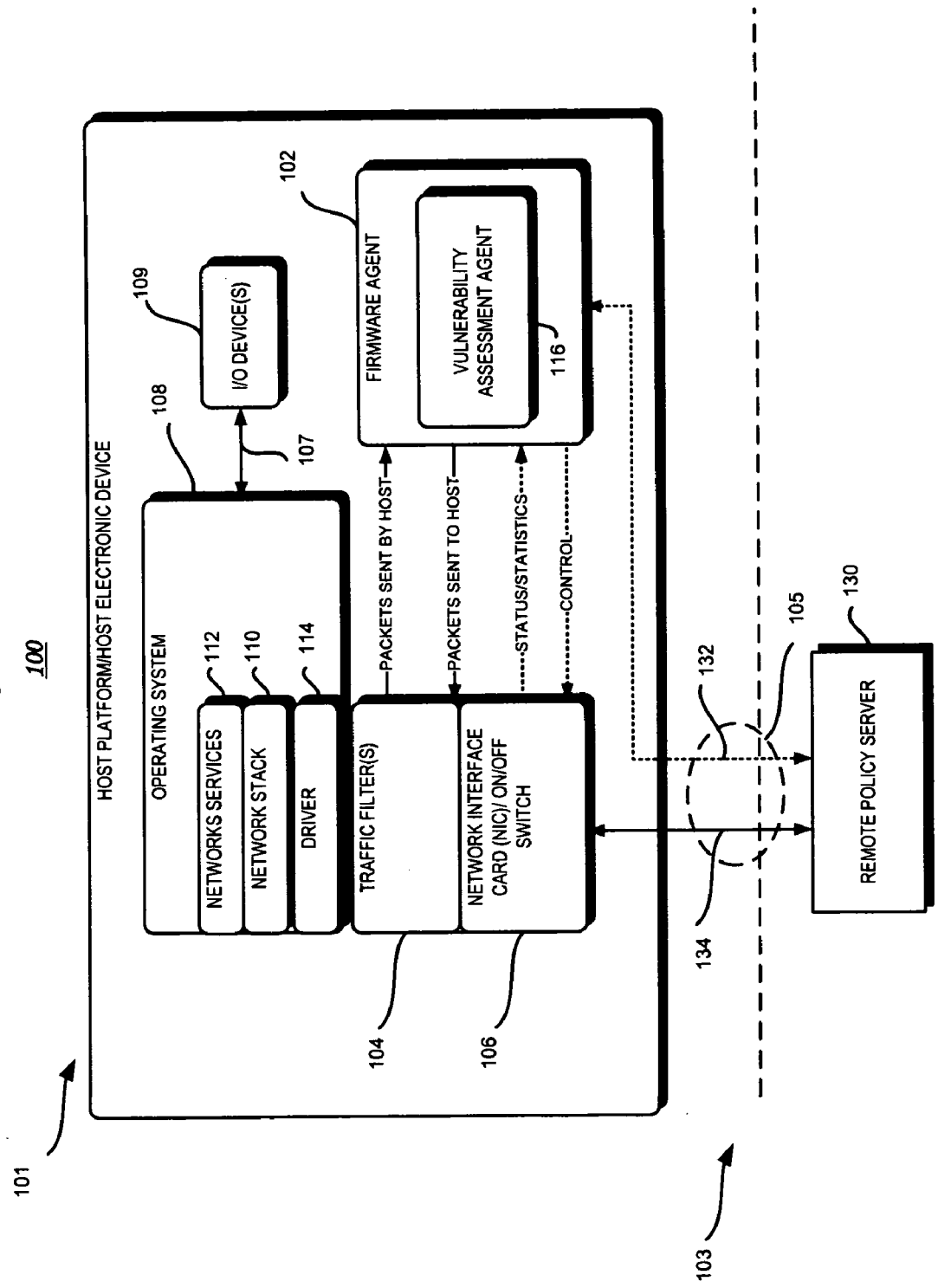
FIG. 1 is a high-level block diagram of a computing environment according to an embodiment of the present invention.

FIG. 1 is a high-level block diagram of a computing architectural environment 100 according to an embodiment of the present invention. The illustrated environment 100 includes a host platform device 101 coupled to an external environment 103, such as a network or another electronic device, via a cable 105.

The host platform device 101 is intended to represent a broad range of electronic devices that may be coupled to the external environment 103. Additional components and software not illustrated in FIG. 1 may be included in various embodiments of the host platform device 101. For example, there may be control logic, instructions, commands, code, computer programs, etc., executed by the host platform device 101 to perform functions described herein.

The network 103 is intended to represent a broad range of computer networks that transfer information among host platform devices and other devices. For example, the network 103 may be a physical or logical network. Examples of physical networks are local area networks (LAN), a wide area networks (WAN), or the like. Examples of logical networks are Virtual LANs (VLAN), Virtual Private Networks (VPN), multi-protocol label switching (MPLS) networks, or the like. Alternatively, the electronic device 103 may be any suitable electronic device, such another host platform device, a personal computer (PC), etc. For purposes of explanation, embodiments of the external environment 103 may be referred to herein as network 103. However, is to be understood that embodiments apply to electronic devices as well.

The cable 105 is intended to represent a broad range of cables that are capable of coupling the host platform device 101 with the network 103. For example, the cable 105 may be coaxial cable, fiber optic cable, twisted pair cable, BNC cable, or other suitable cable.

There also may be other coupling mechanisms, such as bus cables, for example, internal to the host platform device 101. In the illustrated embodiment, a cable 107 couples the operating system 108 to one or more input/output (I/O) devices 109. For some embodiments, one I/O device 109 on the host platform device 101 may be a hard disk drive, for example.

Assume for purposes of explaining embodiments of the present invention that the host platform device 101 wishes to fully connect to the network 103 via the cable 105. The term "fully connect" is intended to mean that the host platform device 101 has full access to the network 103 in terms of the protocols the host platform device 101 may use. Typically, a network would permit a host platform device to connect to the network before any vulnerability that the host platform device 101 may present is assessed. However, in embodiments of the present invention the host platform device 101 includes a firmware agent 102 that prevents the host platform device 101 from fully connecting to the network 103 until the firmware agent 102 performs tests on the host platform device 101 to assess and report any vulnerability that the host platform device 101 may present to the network 103.

In the illustrated embodiment, the firmware agent 102 is coupled to one or more traffic filters 104, which the firmware agent 102 may program to restrict the traffic that flows between the host platform device 101 and the network 103 to bootstrap protocols. Once the firmware agent 102 assesses the vulnerability that the host platform device 101 may present to the network 103, the firmware agent 102 may program the traffic filters 104 to allow other types of traffic to flow between the host platform device 101 and the network 103.

In the illustrated embodiment, the firmware agent 102 is coupled to a network interface card (NIC)/on/off switch 106. For some embodiments, the firmware agent 102 may program the network interface card (NIC)/on/off switch 106 to stop all traffic that would flow between the host platform device 101 and the network 103 or other electronic device.

In the illustrated embodiment, the host platform device 101 includes an operating system (OS) 108. The operating system 108 may perform its conventional functions of managing the allocation and de-allocation of resources within the environment 100 during execution of programs. Embodiments of the present invention may be OS agnostic in that they may be implemented on a variety of operating systems. For instance, embodiments of the present invention may be implemented on Windows®, Linux, Unix, or the like.

In the illustrated embodiment, the operating system (OS) 108 includes a network stack 110, which is a software implementation of the protocol suite to interact with the network 103. In embodiments of the present invention, the network stack 110 may implement an Open Systems Interconnect (OSI) Reference Model, an Internet reference model such as Transport Control Protocol/Internet Protocol (TCP/IP), for example, or other suitable protocol suite.

In the illustrated embodiment, the operating system (OS) 108 includes a network services module 112. In one embodiment, the network services module 112 includes potentially vulnerable services running on top of the network stack 110. In other embodiments, the network services module 112 includes services running on top of the network stack 110 that should not be running on top of the network stack 110.

In the illustrated embodiment, the operating system (OS) 108 includes a driver 114, which may drive the network interface card (NIC)/on/off switch 106 to send data from the operating system (OS) 108 onto the cable 105 and/or to the firmware agent 102.

In the illustrated embodiment, the firmware agent 102 includes a vulnerability assessment agent 116, which may perform network vulnerability assessment heuristics within the host platform device 101 to determine a security posture for the host platform device 101 before the host platform device 101 is fully connected to the network 103. The security posture may be sent as one or more reports to a remote policy server 130 via a secure channel 132. For example, the reports may be cryptographically signed and/or encrypted to ensure their authenticity, integrity, and confidentiality.

In response to the report of the host platform device 101's security posture, the remote policy server 130 may inform the firmware agent 102 that the host platform device 101 may fully connect to the network 103. In one embodiment, the transmission from the remote policy server 130 to the firmware agent 102 indicating that the host platform device 101 may fully connect to the network 103 may be cryptographically signed to ascertain its authenticity and integrity. If the host platform device 101 is fully connected to the network 103, traffic between the host platform device 101 and the network 103 may flow across a bus 134.

Figure 2:
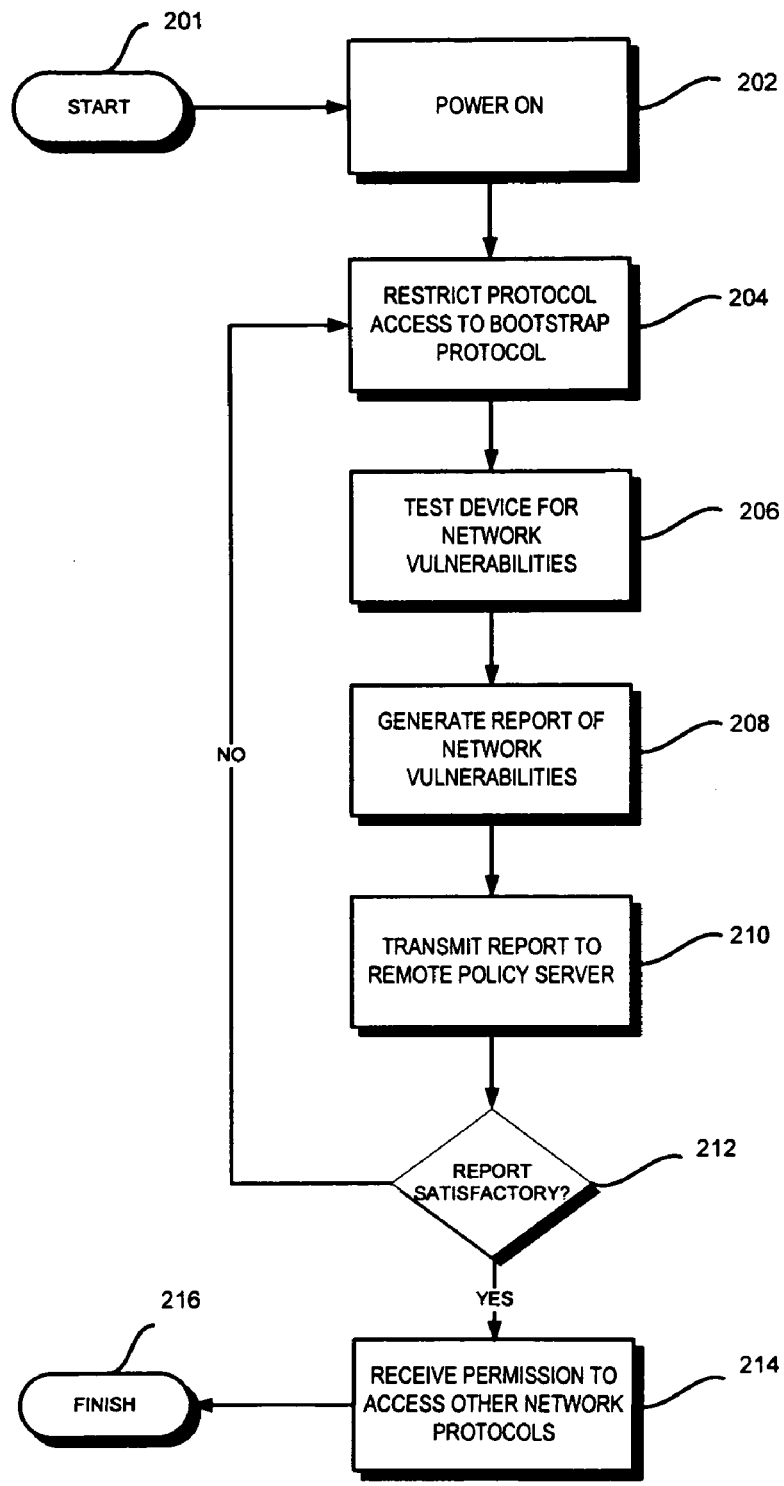
FIG. 2 is a flowchart illustrating a method of operating the computing environment depicted in FIG. 1 according to an embodiment of the present invention.

FIG. 2 is a flowchart illustrating a method 200 of operating the environment 100 according to an embodiment of the present invention. The method 200 begins with a block 201, where control passes to a block 202.

In the block 202, the host platform device 101 may power on and attempt to fully connect to the network 103 or other electronic device. In one embodiment, the firmware agent 102 may detect an uplink event triggered by the host platform device 101.

In a block 204, the firmware agent 102 may prevent the host platform device 101 from fully connecting to the network 103 or electronic device by programming the traffic filters 104 to allow only bootstrap traffic to flow from the host platform device 101 to the network 103 or electronic device. For some embodiments of the present invention, the firmware agent 102 may program the traffic filters 104 to allow only those bootstrap protocols such as a dynamic host configuration protocol (DHCP) protocol, an 802.1x protocol, and/or an extensible authentication protocol over local area network (EAPOL) protocol, for example. For other embodiments, the traffic filters 104 are default programmed to allow only bootstrap traffic such as DHCP, 802.1x, and/or EAPOL.

In a block 206, the firmware agent 102 may test the host platform device 101 for network or electronic device vulnerabilities. In some embodiments, after the network stack 110 is initialized, the firmware agent 102 may simulate that it is a network 103 entity by inserting benign packets into a receive path of the host platform device 101 and receiving return packets in response to the injected packets. The vulnerability assessment agent 116 may compare the return packets with expected return packets and determine a vulnerability status for the host platform device 101 based on the comparison.

Embodiments of the present invention may implement Network Mapper (Nmap) to test the host platform device 101 for network vulnerabilities. Of course, other suitable information technology (IT) tools may be used in the firmware agent 102 to carry out embodiments of the present invention.

For some embodiments, the vulnerability assessment agent 116 may scan the ports on the host platform device 101 to determine whether any ports are open that should not be open, for example, and, if so, determine which ports are open. Alternatively, the vulnerability assessment agent 116 may run a protocol dialog on one or more ports in an attempt to gain access. That is, the vulnerability assessment agent 116 may test the cracking-resistance of the host platform device 101. The host platform device 101 (1) may respond to the port scan by sending an indication to the vulnerability assessment agent 116 that the port is open, (2) may respond to the port scan by sending an indication to the vulnerability assessment agent 116 that the port is closed, or (3) may not respond to the port scan.

For other embodiments of the present invention, the vulnerability assessment agent 116 may determine whether any known protocol or implementation vulnerabilities are present. For example, the vulnerability assessment agent 116 may attempt to exploit any known protocol or implementation vulnerabilities such as worms, known buffer overflow issues, etcs.

In one embodiment, by posing as a network entity the vulnerability assessment agent 116 may determine whether a particular security protocol is installed on the host platform device 101. For example, the vulnerability assessment agent 116 may determine whether Transport Layer Security (TLS) is installed on the host platform device 101. The vulnerability assessment agent 116 may determine whether Internet Protocol Security (IPsec) is installed on the host platform device 101.

If the security protocol is installed on the host platform device 101, the vulnerability assessment agent 116 may determine the minimum security that the security protocol allows for securing a connection between the host platform device 101 and the network 103. For example, the vulnerability assessment agent 116 may establish a connection with the host platform device 101 and observe the options the host platform device 101 offers or permits.

The vulnerability assessment agent 116 also may act as a "bad guy" and try to make the host platform device 101 agree to lower level of security. For example, the vulnerability assessment agent 116 may try to negotiate a downgrade of the cryptographic protocol from TLS to Secure Sockets Layer 3 (SSLv3) and/or from SSLv3 to a more vulnerable Secure Sockets Layer 2 (SSLv2).

For some embodiments, the vulnerability assessment agent 116 may check the algorithms that the host platform device 101 allows for securing the connection. For example, the vulnerability assessment agent 116 may determine whether weak encryption algorithms are allowed, whether a no-encryption-mode is allowed, and/or a no-authentication-mode is allowed. For other embodiments, the vulnerability assessment agent 116 may determine whether the host platform device 101 permits a key length that is too short or whether the host platform device 101 agrees to drop replay protection.

In another embodiment, by posing as a network entity the vulnerability assessment agent 116 may determine a version of the network stack 110 that is running on the host platform device 101 as well as any patches installed on the network stack 110. For some embodiments, suitable signature detection mechanisms may be used to determine the type of network stack 110 that is running on the host platform device 101 based on the protocol used by the host platform device 101, for example. In other embodiments in which the vulnerability assessment agent 116 already may know of one or more particular protocol vulnerabilities, the vulnerability assessment agent 116 may test for the protocol vulnerability in a benign manner.

In embodiments of the present invention, the vulnerability assessment agent 116 may test the ability of the host platform device 101 to transmit one or more stale control messages by including random nonces, monotonically increasing counters and/or using timestamps in messages. This may be performed to determine whether there is an attack on the host platform device 101 that is replaying messages that are sent to the host platform device 101 in an effort to mislead the testing performed by the vulnerability assessment agent 116.

In a block 208, the firmware agent 102 may generate one or more reports of the vulnerabilities that the host platform device 101 may present to the network 103. In one embodiment, the firmware agent 102 may collect the results of the testing performed by the vulnerability assessment agent 116, such as which ports are open on the host platform device 101, which protocols are open on the host platform device 101, vulnerable services are executing on the host platform device 101, what attacks would succeed on the host platform device 101, and the like, to prepare the reports.

In a block 210, the firmware agent 102 may transmit the reports to the remote policy server 130 via the secure channel 132. For some embodiments, the reports may be cryptographically signed for authenticity and integrity. Any of cryptographic communication protection methods may be used. For example, a Secure Hash Algorithm (SHA) may be used to compute one or more cryptographic hash messages for subsequent signing and tamper detection, an RSA engine may be used to sign the cryptographic hash message, an Elliptic Curve Cryptographic (ECC) engine may be used to sign the cryptographic hash message, and/or an optional advanced encryption standard (AES) may be used to encrypt the messages to achieve confidentiality.

In one embodiment, the strength of cryptographic communication protection may be SHA-1 or better, RSA with 1024-bit keys or better, and AES with 128-bit key length for (optional) encryption to achieve confidentiality when necessary. In an alternative embodiment, the strength of cryptographic communication protection may be SHA-1 or better, ECC with 160-bit keys or better, and AES with 128-bit key length. For other embodiments, the strength of cryptographic communication protection may be SHA-256 or better and RSA with 2048-bit keys or better, or SHA-256 or better and ECC with 256-bit keys or better.

In some embodiments, the firmware agent 102 may be pre-configured with a digital identity certificate to authorize communications between the firmware agent 102 and the remote policy server 130. In this embodiment, appropriate key hierarchy may be used in order to utilize the cryptographic strength of the algorithms for the cryptographic communication protections described herein.

In a block 212, the remote policy server 130 determines whether the report is satisfactory. If the report is not satisfactory, control may return to the block 204 in which the remote policy server 130 may not allow the host platform device 101 on the network 103 or access to the electronic device. The firmware agent 102 may continue to prevent the host platform device 101 from fully connecting to the network (or electronic device) 103 by programming the traffic filters 104 to allow only bootstrap traffic to flow from the host platform device 101 to the network (or electronic device) 103. The remote policy server 130 may transmit to the firmware agent 102 via the secure channel 132 indications that the host platform device 101 may not access remaining protocols in the network 103 and fully connect to the network 103 (the electronic device).

For some embodiments, the indication that the host platform device 101 may not access remaining protocols in the network 103 and fully connect to the network 103 (or the electronic device) may be cryptographically signed in a manner similar to that used to send the report to the remote policy server 130. Additionally, for some embodiments the remote policy server 130 may transmit commands to the firmware agent 102 via the secure channel 132 indicating that the host software should reassess the vulnerability test.

In one embodiment, the remote policy server 130 may program the traffic filters 104 (i.e., install rules) to prevent traffic from the host platform device 101 to traverse the bus 134. In an alternative embodiment, the remote policy server 130 may program the NIC on/off switch 106 to block traffic from the host platform device 101 to the bus 134.

For some embodiments, the remote policy server 130 may restrict some traffic from the host platform device 101 that traverses the bus 134 but not all traffic from the host platform device 101 that traverses the bus 134. The security posture of the host platform device 101 may be used to allow a network administrator to decide which types of traffic may traverse the bus 134. As an example, the remote policy server 130 may permit the host platform device 101 to access a server (not shown) in the network 103 identified by a destination port on a particular sub-network, but prevent the host platform device 101 from accessing other portions of the network 103.

If the report is satisfactory, then in a block 214, the remote policy server 130 may transmit to the firmware agent 102 via the secure channel 132 indication that the host platform device 101 may access remaining protocols in the network 103 and fully connect to the network 103. For some embodiments, the indication that the host platform device 101 may access remaining protocols in the network 103 and fully connect to the network 103 may be cryptographically signed in a manner similar to that used to send the report to the remote policy server 130.

The method 200 finishes in a block 216.

The operations of the method 200 have been described as multiple discrete blocks performed in turn in a manner that may be most helpful in understanding embodiments of the invention. However, the order in which they are described should not be construed to imply that these operations are necessarily order dependent or that the operations be performed in the order in which the blocks are presented. Of course, the method 200 is an example method and other methods may be used to implement embodiments of the present invention.

Figure 3:
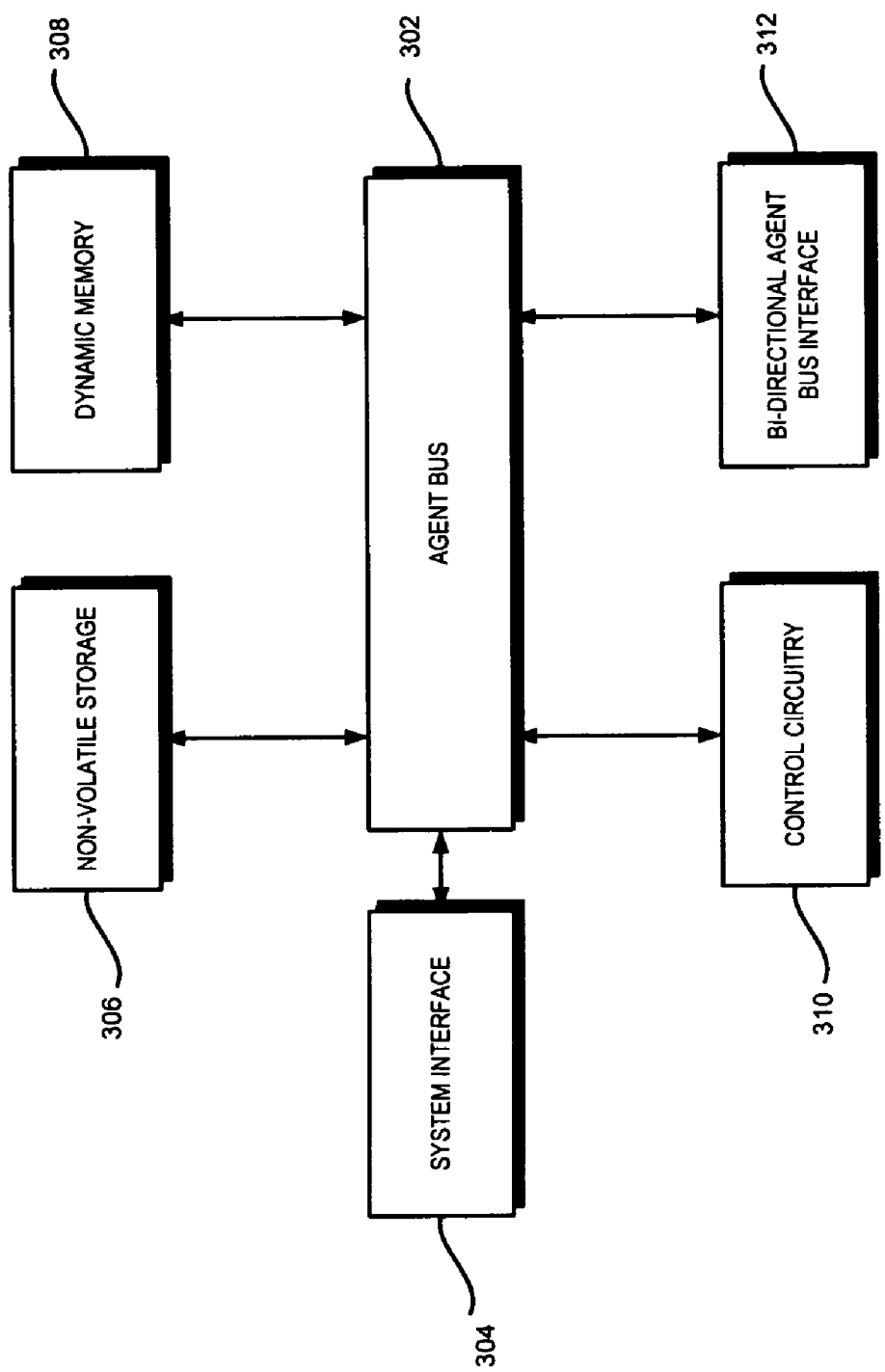
FIG. 3 is a high-level block diagram of the firmware agent depicted in FIG. 1 according to an embodiment of the present invention.

FIG. 3 is a high-level block diagram of the firmware agent 102 according to an embodiment of the present invention. In the illustrated embodiment, the firmware agent 102 includes an agent bus 302, which is coupled to a system interface 304, non-volatile storage 306, dynamic memory 308, control circuitry 310, and a bi-directional agent bus interface 312.

The firmware agent 102 may be an embedded Extensible Firmware Interface (EFI) as defined by the EFI Specifications, version 1.10, published Nov. 26, 2003, available from Intel Corporation of Santa Clara, Calif. In alternative embodiments, other firmware components can also be used. For example, in alternative embodiments the firmware agent 102 may be a virtual machine monitor (VMM) or part of microcontroller firmware in the network interface card (NIC)/on/off switch 106.

The system interface 304 may provide an interface through which the embedded firmware agent 102 may communicate with the host platform system 101 as described above. The non-volatile storage 306 may store static data and/or instructions. The dynamic memory 308 may provide storage for instructions and/or data to be used during operation of the environment 100. The control circuitry 310 may perform control operations and/or execute instructions provided by dynamic memory 308 and/or non-volatile storage 306. The bi-directional agent bus interface 312 may allow the embedded firmware agent 102 to communicate with other environment 100 components. Thus, the firmware agent 102 may include sufficient functionality to perform operations independent of the host platform device 101 and/or the host operating system (OS) 108.

In one embodiment, the firmware agent 102 includes security code residing in the separate protected memory (the non-volatile storage 306 and/or the dynamic memory 308) and executing on a physically separate processor. By virtue of residing in a separate memory, the firmware agent 102 may be immune from host platform device 101's attempts to interfere with the static code. By virtue of executing on a physically separate processor, the firmware agent 102 may be immune from any run-time attacks (such as timing attacks, etc.) that an infected host could try to mount. Having physically separate space also allows storing long-term keys for secure communications and signing the reports. Thus the firmware agent 102 may be protected from tampering attempts by either the host platform device 101 itself, or by remote entities on the network 103.

Figure 4:
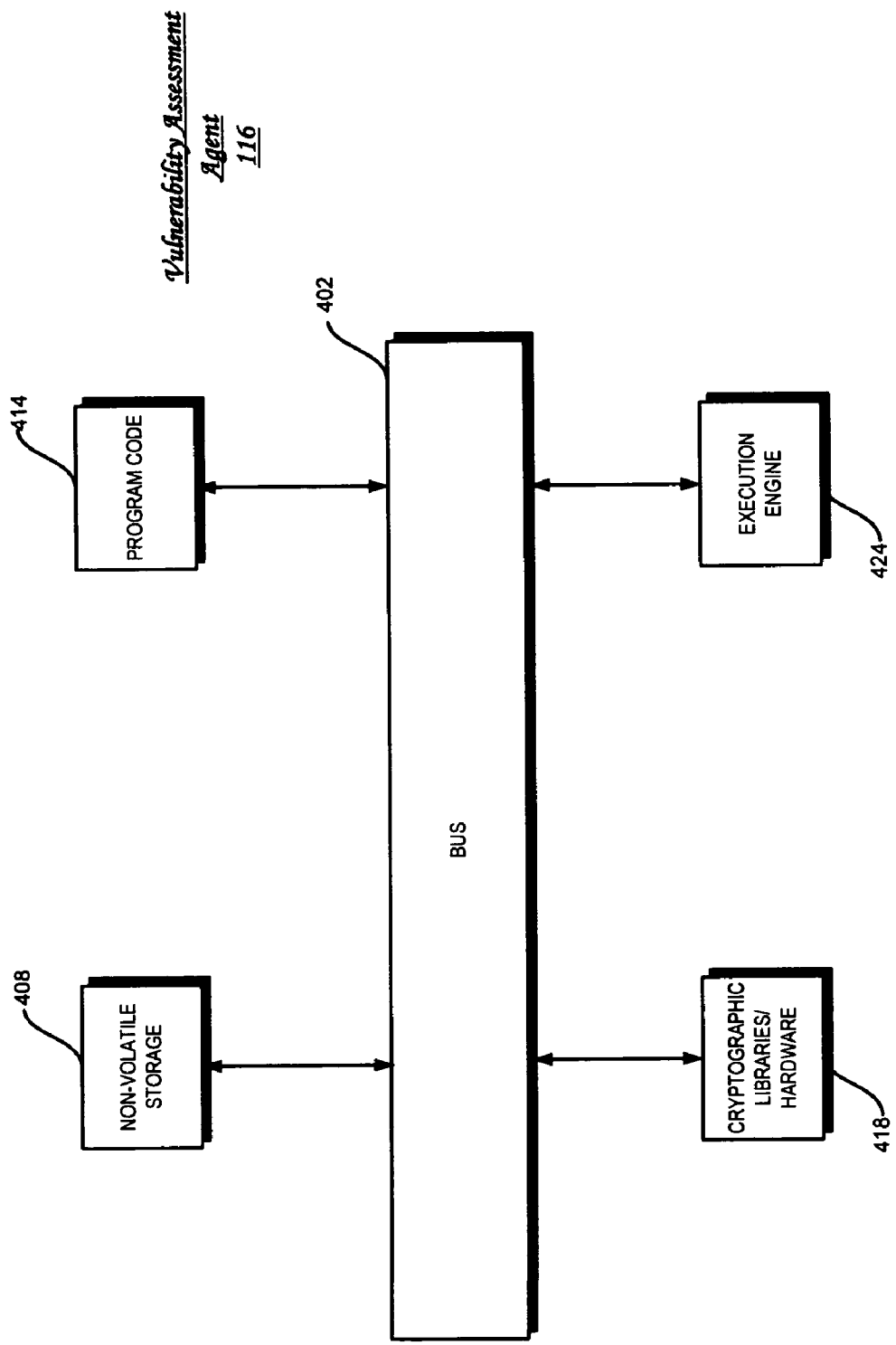
FIG. 4 is a high-level block diagram of the vulnerability assessment agent depicted in FIG. 1 according to an embodiment of the present invention.

FIG. 4 is a high-level block diagram of the vulnerability assessment agent 116 according to an embodiment of the present invention. In the illustrated embodiment, the vulnerability assessment agent 116 includes a bus 402, which is coupled to a non-volatile storage 408, program code storage 414, cryptographic libraries/hardware 418, and an execution engine 424.

For some embodiments, the non-volatile storage 408 may store data and/or instructions for use in operation of the vulnerability assessment agent 116. Program code 414 may be stored in memory, either volatile or non-volatile, and may include instructions that cause the vulnerability assessment agent 116 to provide security operations.

The cryptographic libraries/hardware 418 may compute one or more cryptographic hash messages for the security posture report, may compute one or more cryptographic hash messages for the report, may sign the cryptographic message, and encrypt the message.

In one embodiment, the execution engine 424 may execute program code 414.

Figure 5:
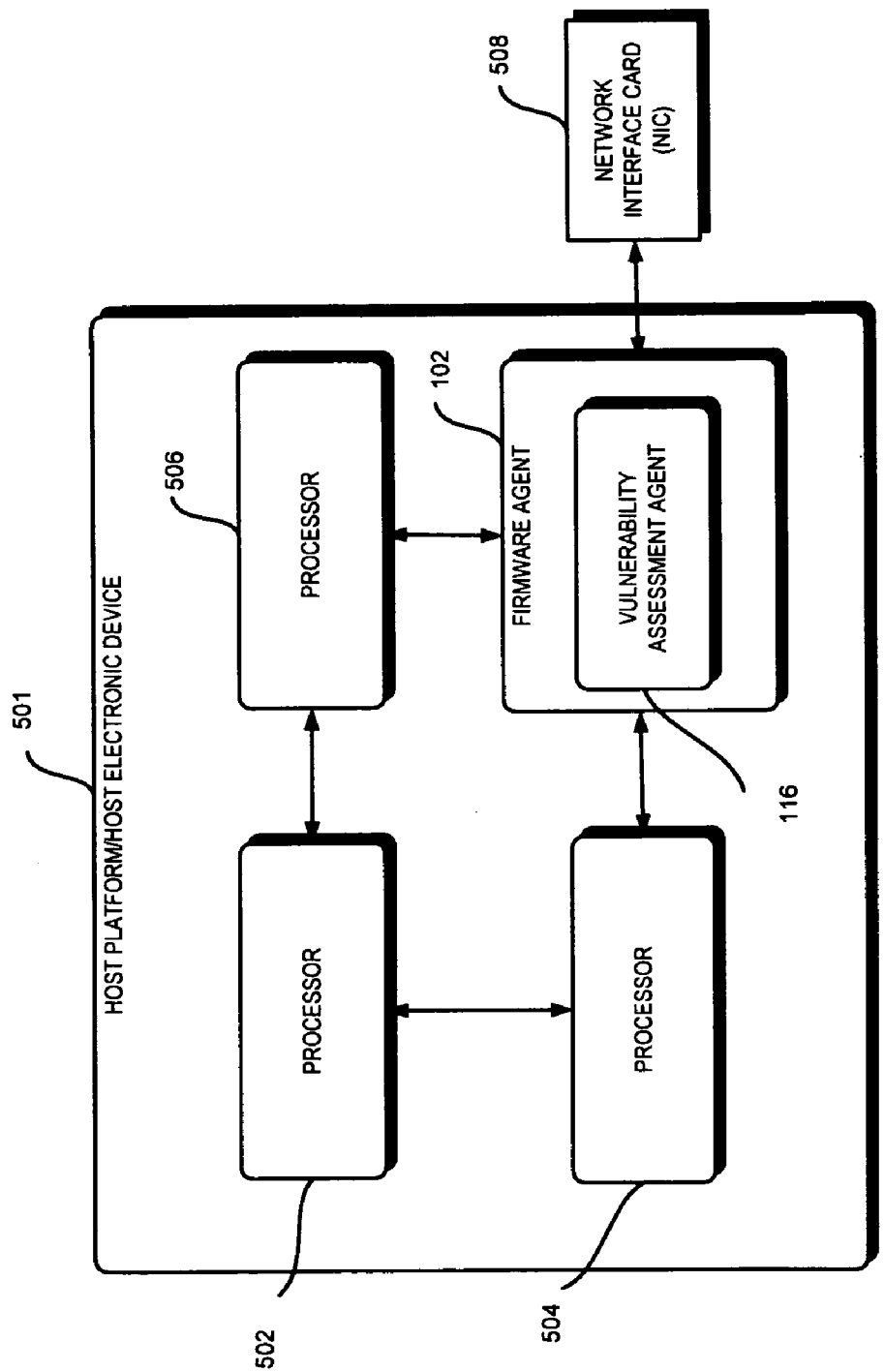
FIG. 5 is a high-level block diagram of a computing environment according to an alternative embodiment of the present invention.

FIG. 5 is a high-level block diagram of a computing environment 500 according to an alternative embodiment of the present invention in which the environment 500 may include a host platform device 501 having a platform of cores. In the illustrated embodiment, the firmware agent 102 is coupled to several processor minicores 502, 504, and 506. The firmware agent 102 also is coupled to a network interface card (NIC) 508. For some embodiments, firmware agent 102 prevents the cores 502, 504, and 506 from fully connecting to the network 103 via the network interface card (NIC) 508 until the firmware agent 102 performs tests on the host platform device 101 to assess and report any vulnerability that the host platform device 101 may present to the network 103.

The processors 502, 504, and 506 may be any suitable processors such as microprocessors, multiprocessors, microcomputers, and/or central processing units that perform conventional functions of executing programming instructions, including implementing the teachings of the embodiments of the present invention.

Embodiments of the present invention may be implemented using hardware, software, or a combination thereof. In implementations using software, the software or machine-readable data may be stored on a machine-accessible medium. The machine-readable data may be used to cause a machine, such as, for example, a processor (not shown) to perform the method 200.

A machine-readable medium includes any mechanism that may be adapted to store information in a form accessible by a machine (e.g., a computer, network device, personal digital assistant, manufacturing tool, any device with a set of one or more processors, etc.). For example, a machine-readable medium includes recordable and non-recordable media (e.g., read only (ROM), random access (RAM), magnetic disk storage media, optical storage media, flash devices, etc.).

In the above description, numerous specific details, such as, for example, particular processes, materials, devices, and so forth, are presented to provide a thorough understanding of embodiments of the invention. One skilled in the relevant art will recognize, however, that the embodiments of the present invention may be practiced without one or more of the specific details, or with other methods, components, etc. In other instances, structures or operations are not shown or described in detail to avoid obscuring the understanding of this description.

Reference throughout this specification to "one embodiment" or "an embodiment" means that a particular feature, structure, process, block, or characteristic described in connection with an embodiment is included in at least one embodiment of the present invention. Thus, the appearance of the phrases "in one embodiment" or "in an embodiment" in various places throughout this specification does not necessarily mean that the phrases all refer to the same embodiment. The particular features, structures, or characteristics may be combined in any suitable manner in one or more embodiments.

The terms used in the following claims should not be construed to limit embodiments of the invention to the specific embodiments disclosed in the specification and the claims. Rather, the scope of embodiments of the invention is to be determined entirely by the following claims, which are to be construed in accordance with established doctrines of claim interpretation.

What is claimed is:

1. A method performed by a host electronic device, comprising:
   detecting, by an agent executing on the host electronic device, an attempt by the host electronic device to fully connect the host electronic device to a network;
   in response to the detecting the attempt, restricting, under control of the agent, all traffic between the host electronic device and the network to only traffic used to boot the host electronic device, the restricting including the agent programming one or more traffic filters of the host electronic device to prevent traffic other than bootstrap protocol traffic from flowing between the host electronic device and the network;

during the restricting all traffic between the host electronic device and the network to only traffic used to boot the host electronic device:

testing, by the agent, the host electronic device from a sub-system within the host electronic device to determine a device vulnerability;

comparing, by the agent, results of the testing with expected test results and generating a report based on the comparison; and transmitting, by the agent, the report from the host electronic device to signify the device vulnerability to a remote policy server; and receiving, at the host electronic device, an indication from the remote policy server of whether the host electronic device is permitted to fully connect to the network, wherein fully connecting the host electronic device to the network includes the agent reprogramming the one or more traffic filters of the host electronic device to allow traffic other than bootstrap protocol traffic to flow between the host electronic device and the network.

2. The method of claim 1, wherein testing the host electronic device comprises the agent performing:

injecting benign test packets into the one or more traffic filters in the host electronic device;

receiving return packets in response to the injected benign test packets;

comparing return packets with expected return packets; and determining the device vulnerability based on the comparison of the return packets with the expected return packets.

3. The method of claim 1, wherein testing the device comprises the agent performing:

determining whether a security protocol is installed on the host electronic device, and if so, what is a minimum security protocol allowed for securing a connection with the host electronic device;

determining whether a patch of a device protocol stack in the device is running on the host electronic device, and if so, what version of the patch is running; and/or determining whether there are any open ports on the host electronic device, and if so, which ports are open.

4. The method of claim 1, further comprising:

establishing a secure channel between the host electronic device and the remote policy server, wherein the transmitting the report from the device to the remote policy server is via the secure channel and wherein the receiving the indication of whether the host electronic device is permitted to connect to fully connect to the network is via the secure channel.

5. The method of claim 4, further comprising cryptographically signing the report and the indication that the host electronic device is permitted to fully connect to the network.

6. The method of claim 1, wherein receiving the indication of whether the host electronic device is permitted to fully connect to the network further comprises receiving an indication that a first type of traffic other than boot traffic can be transmitted from the host electronic device to the network and second type of traffic other than boot traffic cannot be transmitted from the host electronic device to the network.

7. The method of claim 1, wherein receiving the indication of whether the host electronic device is permitted to fully connect to the network comprises receiving an indication that the host electronic device is not permitted to fully connect to the network, the method further comprising the agent performing:

disabling local buses within the host electronic device to protect devices coupled to the local buses.

8. The method of claim 1, further comprising fully connecting the host electronic device to the network.

9. An apparatus, comprising: a host electronic device including:

one or more traffic filters; and an agent to:

detect an attempt by the host electronic device to gain access to protocols used in a network;

restrict access of the host electronic device to at least some protocols in response to the detected attempt, wherein the agent to program the one or more traffic filters to prevent traffic other than bootstrap protocol traffic from flowing between the host electronic device and the network;

wherein, while the agent is to restrict the access by the host electronic device, the firmware agent further to:

insert packets into a receive path of the host electronic device;

in response to inserted packets, receive response packets on a transmit path of the host electronic device;

compare the response packets with expected response packets;

generate a report of a vulnerability status for the host electronic device based on the comparing the response packets with expected response packets;

transmit the report to a remote policy server; and receive an indication of whether the host electronic device is permitted to gain access to other network protocols, wherein the host electronic device to gain access to other network protocols includes the agent to reprogram the one or more traffic filters to allow traffic other than bootstrap protocol traffic to flow between the host electronic device and the network.

10. The apparatus of claim 9, wherein the agent is further to receive an indication that the host electronic device is permitted to gain access to all protocols used in the network including and/or other than bootstrap protocols.

11. The apparatus of claim 9, wherein the agent is further to:

determine a minimum security allowed for securing a connection with the host electronic device;

determine whether a patch of a host electronic device protocol stack in the host electronic device is running on the host electronic device, and if so, what version of the patch is running; and/or determine whether there are any open ports on the host electronic device, and if so, which ports are open.

12. The apparatus of claim 9, wherein the agent is further to restrict access of the host electronic device to an authentication protocol.

13. The apparatus of claim 9, wherein the agent is further to determine whether a cryptographic protocol is installed and/or running on the host electronic device.

14. A system, comprising:

a host electronic device including:

one or more traffic filters; and a firmware agent to:

detect an attempt by the host electronic device to gain access to protocols used in a network;

restrict access by the host electronic device to at least some protocols in response to the detected attempt, wherein the firmware agent to program the one or more traffic filters to prevent traffic other than bootstrap protocol traffic from flowing between the host electronic device and the network;

wherein, while the agent is to restrict the access by the host electronic device, the firmware agent further to:

insert packets into a receive path of the host electronic device, wherein the firmware agent to simulate a network entity;

in response to inserted packets, receive response packets for the simulated network entity on a transmit path of the host electronic device;

compare the received response packets for the simulated network entity with expected response packets;

determine, based on the comparing, a vulnerability status of the host electronic device;

report the vulnerability status to a remote policy server;

receive an indication that the host electronic device is permitted to gain access to other network protocols, wherein the host electronic device to gain access to other network protocols includes the firmware agent to reprogram the one or more traffic filters to allow traffic other than bootstrap protocol traffic to flow between the host electronic device and the network;

an interface to couple the host electronic device to the network; and a cable coupled between the host electronic device and the interface.

15. The system of claim 14, wherein the firmware agent is to detect a link-up event generated by the host electronic device.

16. The system of claim 14, wherein the host electronic device further comprises one or more modules to cryptographically sign the report.

17. The system of claim 16, wherein the modules are further to:

compute one or more cryptographic hash messages for the report;

sign the cryptographic hash messages; and/or encrypt the messages.

18. The system of claim 17, wherein the firmware agent further comprises a digital identity certificate to authorize communications between the firmware agent and the remote policy server.

19. The system of claim 14, further comprising a processor coupled to the network interface to communicate with the network after the traffic filters receive an indication that the device is permitted access to other network protocols including other bootstrap protocols, if there are any other bootstrap protocols previously restricted.

20. An article of manufacture, comprising:

a non-transitory machine-readable storage medium having stored thereon instructions that, when executed, cause one or more processors including at least one firmware agent resident on a host electronic device to:

detect an attempt by the host electronic device to gain access to protocols used in a network;

restrict access of the host electronic device to at least some protocols in response to the detected attempt, wherein the agent to program the one or more traffic filters to prevent traffic other than bootstrap protocol traffic from flowing between the host electronic device and the network;

wherein, while the agent is to restrict the access by the host electronic device, the firmware agent further to:

insert packets into a receive path of the host electronic device;

in response to inserted packets, receive response packets on a transmit path of the host electronic device;

compare the response packets with expected response packets;

generate a report of a vulnerability status for the host electronic device based on the comparing the response packets with expected response packets;

transmit the report to a remote policy server; and receive an indication of whether the host electronic device is permitted to gain access to other network protocols, wherein the host electronic device to gain access to other network protocols includes the agent to reprogram the one or more traffic filters to allow traffic other than bootstrap protocol traffic to flow between the host electronic device and the network.

21. The article of manufacture of claim 20, wherein the instructions are further to cause the firmware agent to attempt to send one or more stale control messages.

22. The article of manufacture of claim 21, wherein the instructions are further to cause the firmware agent to include random nonces in one or more control messages.

23. The article of manufacture of claim 21, wherein the instructions are further to cause the firmware agent to monotonically increase counters to provide a session token for the one or more control messages.

24. The article of manufacture of claim 21, wherein the instructions are further to cause the firmware agent to include a timestamp for the one or more control messages.

* * * * *